P. J. COCO.
BOLL WEEVIL EXTERMINATOR.
APPLICATION FILED APR. 27, 1910.
974,751.
Patented Nov. 1, 1910.
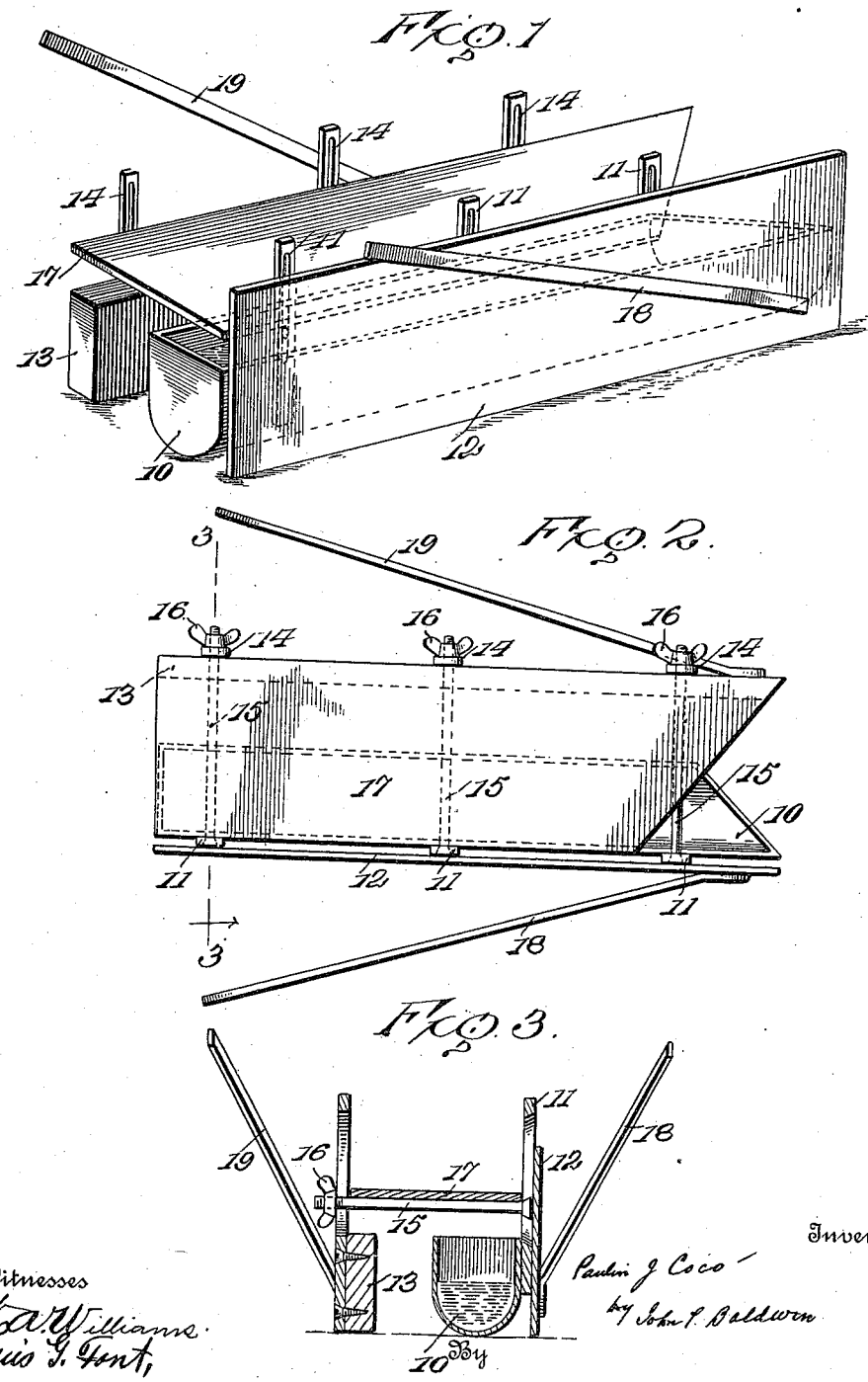

UNITED STATES PATENT OFFICE.

PAULIN J. COCO, OF HAMBURG, LOUISIANA.

BOLL-WEEVIL EXTERMINATOR.

974,751.  Specification of Letters Patent.  Patented Nov. 1, 1910.

Application filed April 27, 1910. Serial No. 557,966.

*To all whom it may concern:*

Be it known that I, PAULIN J. COCO, a citizen of the United States, residing at Hamburg, in the parish of Avoyelles and State of Louisiana, have invented certain new and useful Improvements in Boll-Weevil Exterminators, of which the following is a specification.

The object of my invention is to provide a device for the destruction of injurious plant insects, more especially the cotton-boll-weevil.

In the accompanying drawings, Figure 1 shows the device in perspective. Fig. 2 is a top plan view, and Fig. 3 is a view of a section along the line 3—3 of Fig. 2.

In the preferred form of construction shown in the drawings I provide a tank or receptacle 10 with a rounded bottom and with one end inclined or oblique, and secured to the longer side of the tank I provide the slotted standards 11 and the runner board 12. The second runner 13 is also provided with slotted standards 14, and bolts 15 with wing nuts 16 are engaged in the slots of the standards to hold the two side runners in proper relative position. The said bolts support a cover board 17 and may be adjusted in the slots to sustain the cover board at any desired elevation, also the bolts may be engaged at a greater height in the standards at one side than at the other to hold the cover at a slant to the horizontal, so that the top of the plants are more easily bent over toward the tank with less danger of breaking. The cover may be provided with any desired means to hold it that it may not be lifted by the plants, and at its front end is cut at a bevel to engage and guide the plant tops over the tank, such bevel with the oblique end of the tank providing an entrance which guides the device along the row of plants.

The device is of light weight and is easily operated by two men by means of handles 18 and 19 which are secured to the side runner boards, though if desired any common arrangement could be readily attached so that the device could be pulled along by horses.

In operation the tank is filled about one third or half full with any desired liquid insecticide, preferably a compound of some of the lighter oils, such as benzene, etc., and the cover is adjusted at such height that when over the plants the top of the plant will be forced or bent over the tank, and as the device is moved along the row the plants will be engaged by the oblique end of the cover and as the plant top is bent over the tank and sweeps along the under side of the cover it will contact with and be jarred as it meets the bolts and the insects will drop into and be destroyed by the liquid in the tank.

Having thus described my invention, I claim:—

1. A plant insect destroyer comprising a container for liquid insecticide, a runner frame supporting the same, and a cover adjustably supported above said container and provided with an inclined end for guiding the plant tops over said container.

2. A plant insect destroyer comprising a liquid container secured to a runner board and provided with slotted standards, a second runner with slotted standards, bolts arranged to connect the standards of said runner boards, and a cover board provided with a beveled end arranged on said bolts.

In testimony whereof I affix my signature in presence of two witnesses.

PAULIN J. COCO.

Witnesses:
PIERRE CRALETES,
LOUIS G. FONT.